United States Patent
Hashimoto et al.

(10) Patent No.: US 10,310,466 B2
(45) Date of Patent: Jun. 4, 2019

(54) MANAGING ENERGY CONSUMPTION OF A BUILDING IN AN INTERCONNECTED WIDE AREA MANAGEMENT SYSTEM

(71) Applicant: Hitachi Systems, Ltd., Shinagawa-ku, Tokyo (JP)

(72) Inventors: Kazuo Hashimoto, Yokohama (JP); Yuji Ogata, Saitama (JP); Fumio Enmei, Tokyo (JP); Minoru Kaneko, Yokohama (JP)

(73) Assignee: Hitachi Systems, Ltd., Tokyo (JP)

( * ) Notice: Subject to any disclaimer, the term of this patent is extended or adjusted under 35 U.S.C. 154(b) by 366 days.

(21) Appl. No.: 14/914,723

(22) PCT Filed: Aug. 29, 2013

(86) PCT No.: PCT/JP2013/073196
§ 371 (c)(1),
(2) Date: Feb. 26, 2016

(87) PCT Pub. No.: WO2015/029194
PCT Pub. Date: Mar. 5, 2015

(65) Prior Publication Data
US 2016/0209821 A1  Jul. 21, 2016

(51) Int. Cl.
*G05B 19/04* (2006.01)
*G06Q 10/06* (2012.01)
(Continued)

(52) U.S. Cl.
CPC .......... *G05B 19/042* (2013.01); *G05B 15/02* (2013.01); *G06Q 10/06* (2013.01); *G05B 2219/2639* (2013.01); *G05B 2219/2642* (2013.01)

(58) Field of Classification Search
CPC .............. G05B 19/042; G05B 15/02; G05B 2219/2642; G05B 2219/2639; G06Q 10/06
See application file for complete search history.

(56) References Cited

U.S. PATENT DOCUMENTS 4,375,637 A * 3/1983 Desjardins ............. G08B 29/08
340/10.31
4,382,284 A * 5/1983 Dressel ................. G06F 9/4831
700/295
(Continued)

FOREIGN PATENT DOCUMENTS

JP  2010-279238 A  12/2010
JP  2011-114423 A   6/2011
JP   2012-53549 A   3/2012

OTHER PUBLICATIONS

International Search Report (PCT/ISA/210) issued in PCT Application No. PCT/JP2013/073196 dated Oct. 15, 2013 with English translation (Two (2) pages).
(Continued)

*Primary Examiner* — Mohammad Ali
*Assistant Examiner* — Kelvin Booker
(74) *Attorney, Agent, or Firm* — Crowell & Moring, LLP

(57) ABSTRACT

An increase in communication traffic at the time of transmission of commands of controlling power consumption of individual buildings can be suppressed so as to be low. A wide area management system includes a wide area management device that includes a database that stores a command table and a transmission unit that transmits a control command to each uppermost-level building management device and building management devices, each of which includes a database that stores a management table and a building-associated correspondence table, a transfer unit where, in a case where a reception unit receives the control
(Continued)

command, specifies lower-level building management devices by referring to the management table and transfers the received control command to each of the specified building management devices, an event program extraction unit that extracts an event program corresponding to the control command from a building-associated correspondence table, and an event program execution unit that executes the extracted event program to control power consumption of the buildings.

6 Claims, 16 Drawing Sheets

(51) Int. Cl.
  *G05B 15/02* (2006.01)
  *G05B 19/042* (2006.01)

(56) References Cited

U.S. PATENT DOCUMENTS

| | | | | |
|---|---|---|---|---|
| 4,497,031 A * | 1/1985 | Froehling | ............ | F24F 11/0009 165/212 |
| 4,567,557 A * | 1/1986 | Burns | ................ | G05B 19/0423 340/12.39 |
| 5,172,378 A * | 12/1992 | Sugioka | .................. | G06F 11/22 714/48 |
| 5,778,354 A * | 7/1998 | Leslie | ............... | G06F 17/30321 707/715 |
| 6,029,198 A * | 2/2000 | Iizuka | ................ | G06F 3/04847 709/223 |
| 7,010,622 B1 * | 3/2006 | Bauer | ................ | H04L 41/0233 370/395.31 |
| 7,493,378 B2 * | 2/2009 | Kawashima | ........ | H04L 41/0213 709/203 |
| 7,555,743 B2 * | 6/2009 | Sridhar | .................... | G06F 8/20 717/106 |
| 7,676,300 B2 * | 3/2010 | Kim | ..................... | H04L 12/282 700/276 |
| 7,755,480 B2 * | 7/2010 | Aritsuka | ............... | G06F 21/554 340/286.02 |
| 8,010,764 B2 * | 8/2011 | Keller, Jr. | .............. | G06F 1/3225 711/165 |
| 8,078,330 B2 * | 12/2011 | Brickfield | ............... | H02J 3/008 700/286 |
| 8,374,728 B2 * | 2/2013 | Kim | ......................... | H02J 3/14 700/286 |
| 8,674,543 B2 * | 3/2014 | Kim | ......................... | H02J 3/14 307/31 |
| 8,812,635 B2 * | 8/2014 | Datla | .................. | H04L 41/0613 370/256 |
| 8,996,186 B2 * | 3/2015 | Chen | ...................... | H02J 3/008 700/22 |
| 9,031,091 B2 * | 5/2015 | Kon | .................... | H04L 12/2823 370/466 |
| 9,300,138 B2 * | 3/2016 | Chen | ...................... | H02J 3/008 |
| 9,614,373 B2 * | 4/2017 | Gow | ......................... | H02J 3/14 |
| 2007/0043478 A1 * | 2/2007 | Ehlers | ...................... | F24F 11/30 700/276 |
| 2011/0126035 A1 | 5/2011 | Kaneko | | |
| 2011/0184574 A1 * | 7/2011 | Le Roux | ................ | G01D 4/004 700/291 |
| 2012/0316687 A1 * | 12/2012 | Chen | ...................... | H02J 3/008 700/276 |
| 2012/0316695 A1 * | 12/2012 | Chen | ...................... | H02J 3/008 700/296 |
| 2015/0323921 A1 * | 11/2015 | Saito | ..................... | G06Q 10/04 700/291 |
| 2016/0062328 A1 * | 3/2016 | Hashimoto | ............. | H04Q 9/00 700/275 |
| 2017/0082986 A1 * | 3/2017 | Tokuhashi | ............. | G08C 19/00 |
| 2018/0367320 A1 * | 12/2018 | Montalvo | ............. | G05B 15/02 |

OTHER PUBLICATIONS

Japanese-language Written Opinion (PCT/ISA/237) issued in PCT Application No. PCT/JP2013/073196 dated Oct. 15, 2013 (Four (4) pages).

* cited by examiner

WIDE AREA MANAGEMENT SYSTEM 10

FIG. 4

COMMAND TABLE 220

| COMMAND ID | CONTENT |
|---|---|
| C001 | NORMAL OPERATION |
| C002 | 10% POWER SAVING |
| C003 | 20% POWER SAVING |
| ⋮ | ⋮ |
| C999 | MANUAL MANIPULATION PREFERENTIAL OPERATION |

Columns: 2200, 2201

FIG.5

MANAGEMENT TABLE 221

| BUILDING ID 2210 | ADDRESS INFORMATION 2211 | LOWER-LEVEL ID 2212 |
|---|---|---|
| C000 | * * * * * | B001, B002 |
| B001 | * * * * * | B004, B005 |
| B002 | * * * * * | B006, B007 |
| B003 | * * * * * | — |
| B004 | * * * * * | — |
| B005 | * * * * * | — |
| B006 | * * * * * | B008, B009 |
| B007 | * * * * * | B010 |
| B008 | * * * * * | — |
| B009 | * * * * * | — |
| B010 | * * * * * | B011 |
| B011 | * * * * * | — |

FIG. 6

PROGRAM TABLE 222

| PROGRAM ID (2220) | EVENT PROGRAM MAIN BODY (2221) |
|---|---|
| P001 | * * * * * |
| P002 | * * * * * |
| P003 | * * * * * |
| ⋮ | ⋮ |

FIG.8

POWER INFORMATION TABLE 224

| 2240 | | | | | | |
|---|---|---|---|---|---|---|
| B001 \ B002 \ B003 \ ··· | | | | | | 2241 |

| | 0:00-0:10 | 0:10-0:20 | ··· | 13:00-13:10 | ··· | 23:50-0:00 |
|---|---|---|---|---|---|---|
| ⋮ | ⋮ | ⋮ | ⋮ | ⋮ | ⋮ | ⋮ |
| 2013/2/4(Mon) | 0.5kW | 0.4kW | ··· | 12kW | ··· | 0.6kW |
| 2013/2/5(Tue) | 0.6kW | 0.5kW | ··· | 11kW | ··· | 0.7kW |
| 2013/2/6(Wed) | 0.5kW | 0.4kW | ··· | 15kW | ··· | 0.5kW |
| 2013/2/7(Thu) | 0.5kW | 0.4kW | ··· | 9kW | ··· | 0.6kW |
| 2013/2/8(Fri) | 0.5kW | 0.4kW | ··· | 12kW | ··· | 0.5kW |
| 2013/2/9(Sat) | 0.5kW | 0.4kW | ··· | 7kW | ··· | 0.6kW |
| 2013/2/10(Sun) | 0.5kW | 0.4kW | ··· | 7kW | ··· | 0.6kW |
| 2013/2/11(Mon) | 0.5kW | 0.4kW | ··· | 12kW | ··· | — |

BUILDING 1 (B001)

| COMMAND ID | CONTENT | PROGRAM ID | LIGHTING CONTROL | | | AIR-CONDITIONING CONTROL | | |
|---|---|---|---|---|---|---|---|---|
| | | | LIGHTING 1 | LIGHTING 2 | ... | AIR-CONDITIONING 1 | AIR-CONDITIONING 2 | ... |
| C002 | 10% POWER SAVING | P001 | N/A | N/A | ... | SET TEMPERATURE CHANGE OF 2C° | SET TEMPERATURE CHANGE OF 2C° | ... |
| C003 | 20% POWER SAVING | P002 | DRAW UP BLIND | | ... | SET TEMPERATURE CHANGE OF 4C° | SET TEMPERATURE CHANGE OF 4C° | ... |
| ... | ... | ... | ... | ... | ... | ... | ... | ... |
| C009 | 80% POWER SAVING | P008 | 20% ILLUMINANCE | OFF WHEN ROOM IS NOT USED | ... | OFF | OFF WHEN ROOM IS NOT USED | ... |
| ... | ... | ... | ... | ... | ... | ... | ... | ... |

BUILDING 2 (B002)

| COMMAND ID | CONTENT | PROGRAM ID | LIGHTING CONTROL | | | AIR-CONDITIONING CONTROL | | | ELEVATOR CONTROL | | |
|---|---|---|---|---|---|---|---|---|---|---|---|
| | | | LIGHTING 1 | LIGHTING 2 | ... | AIR-CONDITIONING 1 | AIR-CONDITIONING 2 | ... | ELEVATOR 1 | ELEVATOR 2 | ... |
| C002 | 10% POWER SAVING | P101 | N/A | N/A | ... | SET TEMPERATURE CHANGE OF 2C° | SET TEMPERATURE CHANGE OF 2C° | ... | OPERATING | OPERATING | ... |
| C003 | 20% POWER SAVING | P102 | DRAW UP BLIND | DRAW UP BLIND | ... | SET TEMPERATURE CHANGE OF 2C° | SET TEMPERATURE CHANGE OF 2C° | ... | STOP | OPERATING | ... |
| ... | ... | ... | ... | ... | ... | ... | ... | ... | ... | ... | ... |
| C009 | 80% POWER SAVING | P108 | 20% ILLUMINANCE | OFF WHEN ROOM IS NOT USED | ... | OFF WHEN ROOM IS NOT USED | OFF WHEN ROOM IS NOT USED | ... | STOP | OPERATING | ... |
| ... | ... | ... | ... | ... | ... | ... | ... | ... | ... | ... | ... |

FIG. 13

MANAGEMENT TABLE 221

| BUILDING ID | ADDRESS INFORMATION | LOWER LEVEL ID | RATED POWER |
|---|---|---|---|
| C000 | * * * * * | B001, B002 | — |
| B001 | * * * * * | B004, B005 | 50kW |
| B002 | * * * * * | B006, B007 | 40kW |
| B003 | * * * * * | — | 60kW |
| B004 | * * * * * | — | 50kW |
| B005 | * * * * * | — | 50kW |
| B006 | * * * * * | B008, B009 | 60kW |
| B007 | * * * * * | B010 | 40kW |
| B008 | * * * * * | — | 60kW |
| B009 | * * * * * | — | 50kW |
| B010 | * * * * * | B011 | 40kW |
| B011 | * * * * * | — | 30kW |

MANAGING ENERGY CONSUMPTION OF A BUILDING IN AN INTERCONNECTED WIDE AREA MANAGEMENT SYSTEM

TECHNICAL FIELD

The present invention relates to a wide area management system, a wide area management device, a building management device, and a wide area management method.

BACKGROUND ART

In the related art, in buildings such as office buildings, hospitals, schools, and factories, management devices managing facility devices exist, and in addition, systems monitoring information of the facility devices in a plurality of buildings through a communication network from remote locations exist.

In this manner, there is disclosed a technique where, by implementation of high speed and broad band of the communication network, data comparison between buildings distributed in a wide area is easily performed in real time, and thus, facility devices in a plurality of the buildings are cooperated to be automatically controlled (for example, refer to Patent Literature 1 listed below).

CITATION LIST

Patent Literature

Patent Literature 1: JP 2012-53549 A

SUMMARY OF INVENTION

Technical Problem

However, in a wide area management device disclosed in Patent Literature 1, although a command may be issued to a plurality of buildings in an event program selection unit, if the number of to-be-managed buildings is increased, the number of event programs for generating the commands which are to be issued to the buildings is also increased, so that it is difficult to manage the event programs. For example, although the power consumption of each building in a short time interval such as a unit of 1 hour may be needed to be controlled, since the wide area management device disclosed in Patent Literature 1 intensively manages the power consumption of the plurality of buildings, if the number of to-be-managed buildings is large, each time, it may be temporally difficult to generate the command for each building.

In addition, the wide area management device disclosed in Patent Literature 1 transmits individual commands for controlling the power consumption of the to-be-managed buildings to all the management devices which manage the buildings. For example, if the number of to-be-managed buildings is increased, communication traffic taken to transmit the control command may be increased, the delay of reaching of the control command may occur, or trouble for reception and transmission of different communication data on a network may occur.

In consideration of the above-described circumstances, the present invention is to reduce a processing amount of a wide area management device by distributing a process of controlling power consumption of individual buildings into the wide area management device and building management devices even in a case where the number of to-be-managed buildings is large and to suppress an increase in communication traffic at the time of transmission of commands of controlling power consumption of individual buildings so as to be low.

Solution to Problem

A first aspect of the present invention to achieve the above object is a wide area management system which manages power consumed in buildings, including: a wide area management device; and building management devices installed to correspond to the respective buildings, wherein the wide area management device includes: a first management table storage unit which stores a management table storing information of lower-level building management devices managed by each building management device as an upper-level representative management device for each building management device; and a transmission unit which specifies an uppermost-level building management device by referring to the management table stored in the first management table storage unit and transmits one control command instructing reduction of power consumption of each building for each specified building management device, and wherein each building management device includes: a second management table storage unit which stores the management table; an event program storage unit which stores an event program describing a content of control which is to be performed on each facility device in the building corresponding to the building management device in association with the control command in order to implement the control command; a reception unit which receives the control command from the wide area management device or the upper-level representative management device; a transfer unit which, in a case where the reception unit receives the control command, specifies lower-level building management devices managed by the self building management device as a representative management device by referring to the management table stored in the second management table storage unit and transfers the received control command to each of the specified building management devices; an event program extraction unit which, in a case where the reception unit receives the control command, extracts the event program corresponding to the control command from the event program storage unit; and an event program execution unit which executes the extracted event program to control the power consumption of each facility device in the building corresponding to the self building management devices.

In addition, in the wide area management system, in a case where the first management table storage unit stores the management table, the transmission unit may specify the uppermost-level building management device by referring to the management table and transmit the management table to the specified building management device. In addition, in a case where the reception unit receives the management table from the wide area management device or the upper-level representative management device, the reception unit may store the received management table in the second management table storage unit. In addition, in a case where the second management table storage unit stores the management table, the transfer unit may specify the lower-level building management devices by referring to the management table and transfer the management table to the specified building management devices.

In addition, in the wide area management system, each building management device may further include: a power information storage unit which stores information of the power consumption of the buildings corresponding to the building management devices in association with the self building management device and the lower-level building management devices; a power information collection unit which collects the information of the power consumption of the building corresponding to the self building management device to store the information in the power information storage unit and collects the information of the power consumption of the buildings corresponding to the lower-level building management devices from the lower-level building management devices to store the information in the power information storage unit; and an additional command transmission unit which, after the transfer unit transfers the control command received by the reception unit to each of the lower-level building management devices and the event program execution unit of the self building management device executes the event program corresponding to the control command, calculates a sum of the power consumption of the building corresponding to the self building management device and the buildings corresponding to the lower-level building management devices by referring to the power information storage unit, in a case where the calculated sum of the power consumption is equal or larger than power consumption of which reduction is instructed by the control command, generates an additional command instructing new reduction of power consumption, and transmits the generated additional command to the event program extraction unit of the self building management device or to at least one of the lower-level building management devices.

In addition, in the wide area management system, the additional command transmission unit may select one destination for the additional command among the event program extraction unit of the self building management device and the lower-level building management devices corresponding to the buildings of which the power consumption is smaller than the power consumption instructed by the control command and transmits the additional command to the selected building management device.

In addition, in the wide area management system, the additional command transmission unit may transmit the additional command to each of the event program extraction unit of the self building management device and the lower-level building management devices corresponding to the buildings of which the power consumption is smaller than the power consumption instructed by the control command.

In addition, a second aspect of the present invention is, for example, a wide area management device used for a wide area management system managing power consumed in buildings, including: a management table storage unit which stores a management table storing information of lower-level building management devices managed by each building management device as an upper-level representative management device for each building management device installed to correspond to the respective buildings; and a transmission unit which specifies an uppermost-level building management device by referring to the management table stored in the management table storage unit and transmits one control command instructing reduction of power consumption of each buildings to each specified building management device.

In addition, a third aspect of the present invention is a building management device installed to correspond to each of buildings, including: a management table storage unit which stores a management table storing information of lower-level building management devices managed by each building management device as an upper-level representative management device for each building management device; and an event program storage unit which stores an event program describing a content of control which is to be performed on each facility device in the building corresponding to the building management devices in association with a control command instructing reduction of power consumption of each building in order to implement the control command; a reception unit which receives the control command from the wide area management device or the upper-level representative management device; a transfer unit which, in a case where the reception unit receives the control command, specifies lower-level building management devices managed by the self building management device as a representative management device by referring to the management table stored in the management table storage unit and transfers the received control command to each of the specified building management devices; an event program extraction unit which, in a case where the reception unit receives the control command, extracts the event program corresponding to the control command from the event program storage unit; and an event program execution unit which executes the extracted event program to control the power consumption of each facility device in the building corresponding to the self building management devices.

In addition, a fourth aspect of the present invention is a wide area management method in a wide area management system including a wide area management device and building management devices installed in corresponding buildings to manage power consumed in the buildings, wherein the wide area management device performs a transmitting step of specifying an uppermost-level building management device by referring to a first management table storage unit storing a management table storing information of lower-level building management devices managed by each building management device as an upper-level representative management device for each building management device and transmitting one control command instructing reduction of power consumption of each building for each specified building management device, and wherein each building management device performs: a receiving step of receiving the control command from the wide area management device or the upper-level representative management device; a transferring step of, in a case where the reception unit receives the control command, specifying lower-level building management devices managed by the self building management device as a representative management device by referring to a second management table storage unit storing the management table and transferring the received control command to each of the specified building management devices; an event program extracting step of, in a case where the control command is received in the receiving step, extracting an event program corresponding to the control command in association with the control command in order to implement the control command by referring to an event program storage unit storing the event program describing a content of control which is to be performed on each facility device in the building corresponding to the building management device; and an event program executing step of executing the extracted event program to control the power consumption of each facility device in the building corresponding to the self building management device.

In addition, in the wide area management method, in the transmitting step, in a case where the first management table storage unit stores the management table, the wide area management device may specify the uppermost-level building management device by referring to the management table and transmits the management table to the specified building management device. In addition, in the receiving step, in a case where the management table is received from the wide area management device or the upper-level representative management device, each building management device may store the received management table in the second management table storage unit. In addition, in the transferring step, in a case where the second management table storage unit stores the management table, each building management device may specify the lower-level building management devices by referring to the management table and transfer the management table to the specified building management devices.

In addition, in the wide area management method, each building management device may perform: a power information collecting step of collecting the information of the power consumption of the building corresponding to the self building management device to store the information in the power information storage unit and collecting the information of the power consumption of the buildings corresponding to the lower-level building management devices from the lower-level building management devices to store the information in the power information storage unit; and an additional command transferring step of, after the control command received in the receiving step is transferred to each of the lower-level building management devices in the transmitting step and the event program corresponding to the control command is executed in the event program executing step of the self building management device, calculating a sum of the power consumption of the building corresponding to the self building management device and the buildings corresponding to the lower-level building management devices by referring to the power information storage unit, in a case where the calculated sum of the power consumption is equal or larger than power consumption of which reduction is instructed by the control command, generating an additional command instructing new reduction of power consumption, and extracting the event program corresponding to the generated additional command in the event program extracting step or transmitting the generated additional command to at least one of the lower-level building management devices.

In addition, in the wide area management method, in the additional command transmitting step, each building management device may select one destination for the additional command among the self building management device and the lower-level building management devices of which the power consumption is smaller than the power consumption instructed by the control command and transmit the additional command to the selected building management device.

In addition, in the wide area management method, in the additional command transmitting step, each building management device may transmit the additional command to each of the self building management device and the lower-level building management devices of which the power consumption is smaller than the power consumption instructed by the control command.

Advantageous Effects of Invention

According to the present invention, it is possible to reduce a processing amount of a wide area management device by distributing a process of controlling power consumption of individual buildings into the wide area management device and building management devices even in a case where the number of to-be-managed buildings is large and to suppress an increase in communication traffic at the time of transmission of commands of controlling power consumption of individual buildings so as to be low.

BRIEF DESCRIPTION OF DRAWINGS

FIG. 4 is a diagram illustrating an example of a data structure of a command table 220 stored in a database 22.

FIG. 5 is a diagram illustrating an example of a data structure of a management table 221 stored in the database 22.

FIG. 6 is a diagram illustrating an example of a data structure of a program table 222 stored in the database 22.

FIG. 8 is a diagram illustrating an example of a data structure of a power information table 224 stored in the database 22.

FIG. 9 is a conceptual diagram illustrating an example of control contents for buildings 14.

FIG. 13 is a diagram illustrating an example of a data structure of a management table 221 stored in a database 22 in a second embodiment.

DESCRIPTION OF EMBODIMENTS

First, a first embodiment of the present invention will be described with reference to the drawings.

Figure 1:
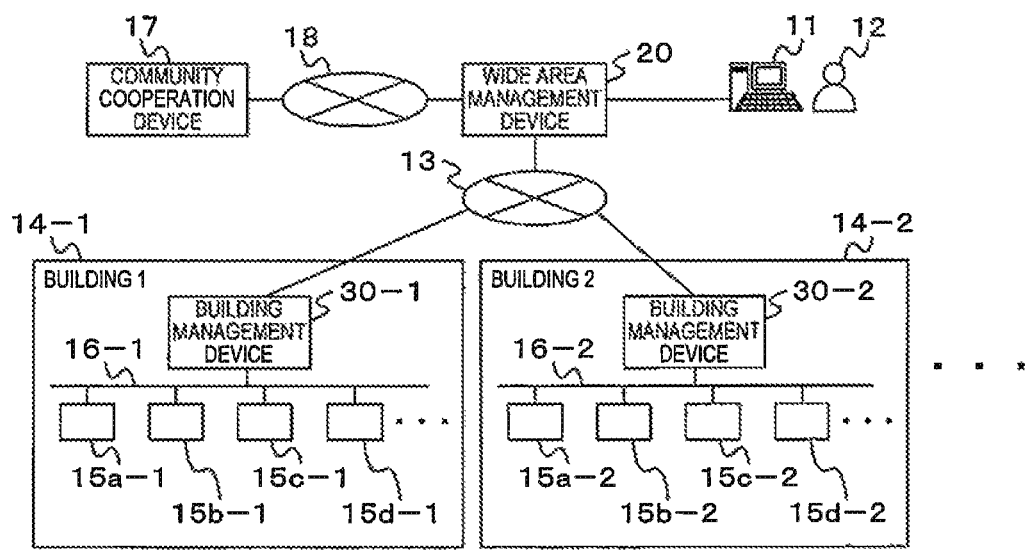
FIG. 1 is a system configuration diagram illustrating an example of a configuration of a wide area management system 10 according to an embodiment of the present invention.

FIG. 1 is a system configuration diagram illustrating an example of a configuration of a wide area management system 10 according to an embodiment of the present invention. The wide area management system 10 is configured to include a wide area management device 20 and building management devices 30 (30-1 and 30-2) installed in a plurality of buildings 14 (14-1 and 14-2). The wide area management device 20 and the building management devices 30 are connected to communication lines 13, so that reception/transmission of communication data can be performed through the communication lines 13.

Figure 2:
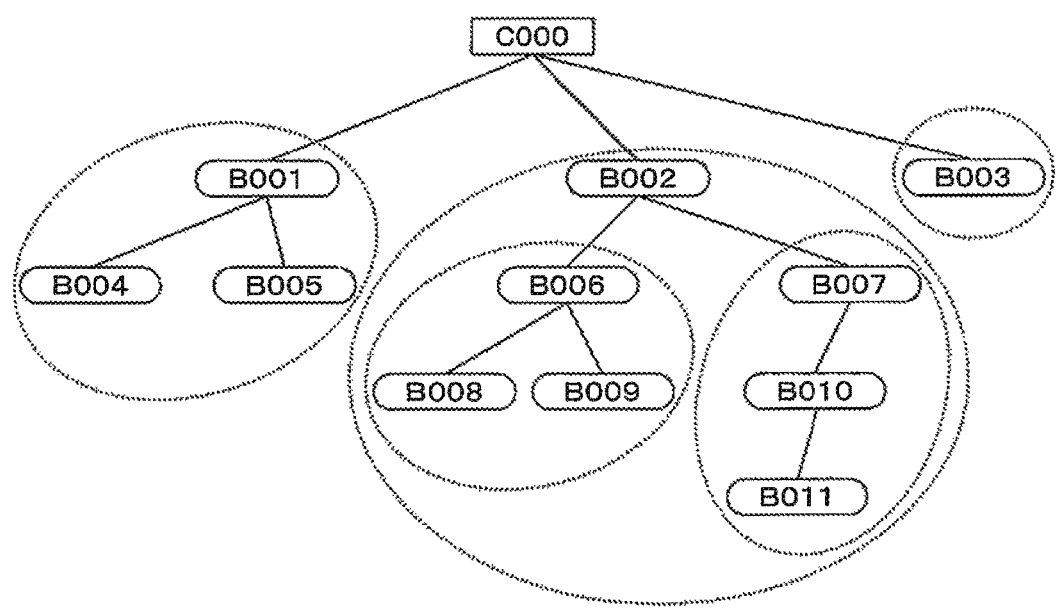
FIG. 2 is a conceptual diagram illustrating a hierarchical structure of building management devices 30.

The wide area management system 10 according to the embodiment has, for example, a hierarchical structure as illustrated in FIG. 2 (a conceptual diagram for explaining a hierarchical structure of the building management devices 30). In FIG. 2, "C000" denotes the wide area management device 20, and "B001" to "B011" denote building IDs of buildings corresponding to the building management devices 30. In the embodiment, basically, the devices connected by lines in FIG. 2 perform communication with each other. In the example of FIG. 2, the uppermost-level building management devices 30 are building management devices 30 of "B001" to "B003" and perform communication with the wide area management device 20.

In the embodiment, for example, like the building management device 30 of "B001", "B002", "B006", "B007", or "B010", a building management devices 30, in a lower level of which one or more building management devices 30 exist, is referred to as a "representative management device". The "representative management device" transmits data received from an upper-level wide area management device 20 or an upper-level representative management device to lower-level building management devices 30 or lower-level representative management device and transmits data received from the lower-level building management devices 30 or the lower-level representative management device to the upper-level wide area management device 20 or the upper-level representative management device.

In the embodiment, one representative management device is installed in unit of building management devices 30 corresponding to buildings which are, for example, geographically near or under the management of the same organization as indicated by dotted lines of FIG. 2 or a plurality of building management devices 30 included in the same communication network.

The wide area management device 20 receives a control command of controlling power consumption of the buildings 14 from a manager 12 through a manipulation terminal 11 and transmits the received control command through the communication lines 13 to the uppermost-level building management device 30 or the representative management device. Each representative management device transfers the received control command to the lower-level building management devices 30 or the lower-level representative management devices.

In addition, even in a case where the wide area management device 20 receives a control command from a different device through a communication line 18, the wide area management device may perform the same operations as those in a case where the wide area management device receives the control command from the manager 12 through the manipulation terminal 11. As the above-mentioned "other device", for example, in an energy management system for the entire region such as a Cluster/Community Energy Management System (CEMS), a community cooperation device 17 which transmits a control command for controlling power of each building in the region or the like is considered.

Each building management device 30 is connected to a communication network 16 such as a LAN installed in the building 14 so that the building management devices can perform reception and transmission of communication data with facility devices 15 installed in the building 14 through the communication network 16. In addition, each building management device 30 receives an event program associated with the control command from the wide area management device 20 through the communication line 13 and stores the event program. Each building management device 30 may be configured with, for example, a device used for a Building Energy and Environmental Management System (BEMS).

In the embodiment, the event program is a program for controlling power consumption of the facility devices 15 by controlling operations of the facility devices 15 installed in the building 14. In a case where each building management device 30 receives a command ID of a control command from the wide area management device 20 through the communication line 13, the building management device controls the entire power consumption of the building 14 in response to the control command by performing the event program corresponding to the received command ID.

Figure 3:
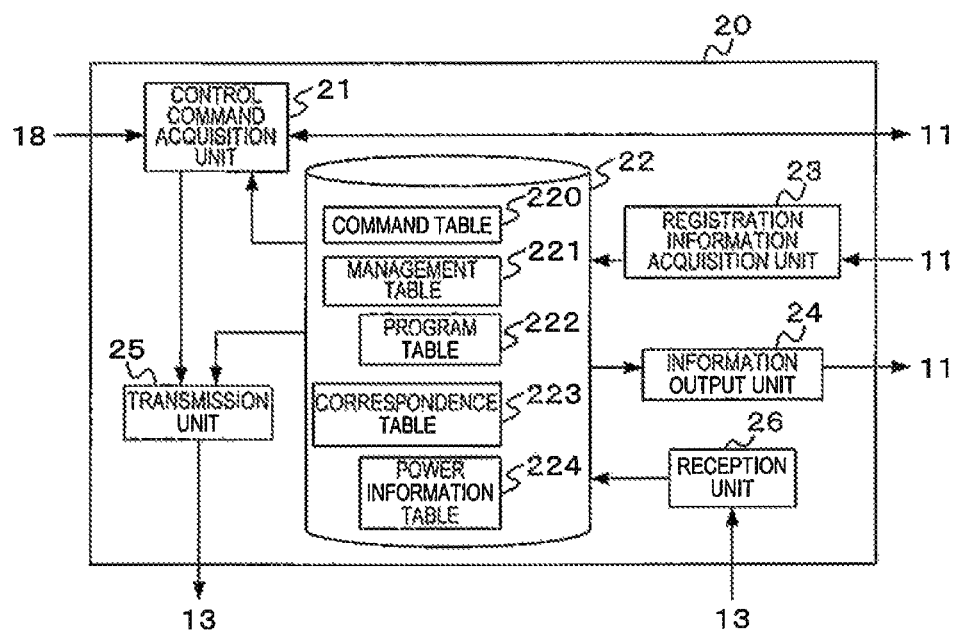
FIG. 3 is a block diagram illustrating an example of a functional configuration of a wide area management device 20 according to a first embodiment.

FIG. 3 is a block diagram illustrating an example of a detailed functional configuration of the wide area management device 20 according to the first embodiment. The wide area management device 20 according to the embodiment is configured to include a control command acquisition unit 21, a database 22, a registration information acquisition unit 23, an information output unit 24, a transmission unit 25, and a reception unit 26. The database 22 stores a command table 220, a management table 221, a program table 222, a correspondence table 223, and a power information table 224.

For example, as illustrated in FIG. 4 (a diagram illustrating an example of a data structure of the command table 220 stored in the database 22), the command table 220 stores information indicating a content 2201 of the control command in association with a command ID 2200 identifying each control command.

Herein, "normal operation" is a command instructing that, for example, normal operations are performed with predetermined settings; "x % power saving" is a command instructing that, for example, a sum of power consumption of all the buildings under the management is set to be x % of the power consumption during rated operation; and "manual manipulation preferential operation" is a command instructing that, for example, normal operation is basically performed and, in a case where there is manual manipulation, control according to the manipulation is preferentially performed.

For example, as illustrated in FIG. 5 (a diagram illustrating an example of a data structure of the management table 221 stored in the database 22), the management table 221 stores address information 2211 of the building management device 30 and lower-level IDs 2212 indicating building IDs of different building management devices 30 which are at levels lower than the building management device 30 in association with the building ID 2210 identifying the building corresponding to each building management device 30.

By referring to the management table 221, it can be seen that the building management device 30, in the lower-level ID of which the data are registered, is a representative management device, and it can be seen that building IDs or address information of lower-level or upper-level different building management devices 30 with respect to each building management device 30.

For example, as illustrated in FIG. 6 (a diagram illustrating an example of a data structure of the program table 222 stored in the database 22), the program table 222 stores event program main bodies 2221 in association with program IDs 2220 identifying event programs.

Figure 7:
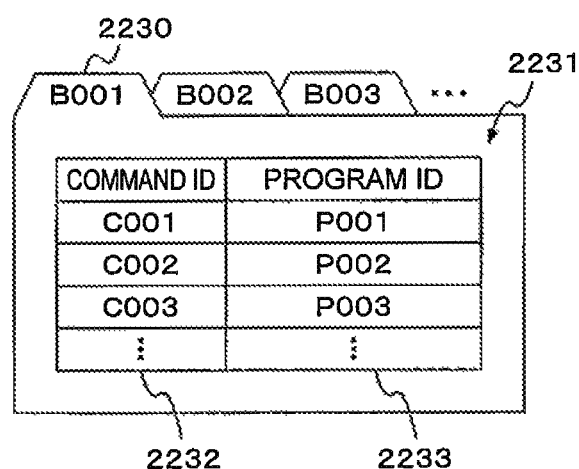
FIG. 7 is a diagram illustrating an example of a data structure of a correspondence table 223 stored in the database 22.

For example, in illustrated in FIG. 7 (a diagram illustrating an example of a data structure of the correspondence table 223 stored in the database 22), the correspondence table 223 stores building-associated correspondence tables 2231 in association with the building IDs 2230. Each building-associated correspondence table 2231 stores, for each command ID 2232 identifying each control command, a program ID 2233 of the event program embodying the control command in the corresponding building 14.

For example, as illustrated in FIG. 8 (a diagram illustrating an example of a data structure of the power information table 224 stored in the database 22), the power information table 224 stores individual power information tables 2241 in association with building IDs 2240. Each individual power information table 2241 stores, for each time zone, power consumption 2243 in association with date 2242. The power consumption 2243 indicates a sum of power consumption of the facility devices 15 in the building 14 according to the building ID 2240 in each time zone.

In a case where reading of control command is requested from the manager 12 through the manipulation terminal 11, the control command acquisition unit 21 reads the command ID and the content of the corresponding control command from the command table 220 of the database 22 and displays the command ID and the content on a screen of the manipulation terminal 11. Next, in a case where a selection of the control command is received from the manager 12 through the manipulation terminal 11, the control command acquisition unit 21 transmits the command ID of the selected control command to the transmission unit 25.

In a case where data of the command table 220, the management table 221, and the program table 222, or the correspondence table 223 are received from the manager 12 through the manipulation terminal 11, the registration information acquisition unit 23 stores the received data in the database 22.

In a case where the management table 221 is stored in the database 22, the transmission unit 25 specifies the address information of the uppermost-level building management device 30 by referring to the stored management table 221 and transmits the data of the management table 221 to a destination indicated by the specified address information through the communication line 13.

In addition, in a case where the program table 222 or the correspondence table 223 is stored in the database 22, or in a case where the command ID is received from the control command acquisition unit 21, the transmission unit 25 specifies the address information of the uppermost-level building management device 30 by referring to the management table 221 of the database 22 and transmits data of the program table 222 or the correspondence table 223 or the command ID to the destination indicated by the specified address information through the communication line 13. The transmitted data may be sequentially transferred to lower-level building management devices 30 by each representative management device, and finally, all the building management devices 30 may receive the data.

In a case where the building ID and the sum of power consumption for each date and each time zone are received from the uppermost-level building management device 30 through the communication line 13, the reception unit 26 specifies the individual power information table 2241 corresponding to the received building ID in the power information table 224 of the database 22 and stores the received sum of power consumption in the columns of the corresponding date and time zone of the specified individual power information table 2241.

In a case where reading of data in the database 22 is instructed by the manager 12 through the manipulation terminal 11, the information output unit 24 reads the instructed data from the database 22 and displays the data on the manipulation terminal 11. The information in the database 22 is displayed on the manipulation terminal 11, so that the manager 12 can acquire information of determining whether to transmit a control command or which control command to be transmitted or information as to how much the power consumption of each building is changed after transmission of the control command.

Herein, the control command and the contents of the event program executed for each building 14 are described in association with each other, for example, as illustrated in FIG. 9 (a conceptual diagram for explaining an example of contents of control for each building 14).

As illustrated in FIG. 9, for example, the "building 1" with the building ID "B001" may be associated with the event program "P001" performing control of the content that, with respect to the control command "C001" of "10% power saving", for the "lighting control", the control is not performed, and for the "air-conditioning control", the "set temperature is changed 2° C.". For the "air-conditioning control", the "set temperature is changed 2° C." denotes that, for example, during cooling, the set temperature is increased 2° C., and during heating, the set temperature is deceased 2° C.

In addition, the "building 1" may be associated with the event program "P002" performing control of the content that, with respect to the control command "C002" of "20% power saving", for the "lighting control", the "blind in the vicinity of the lighting 1 is drawn up", and for the "air-conditioning control", the "set temperature is changed 4° C.". Since the "building 1" is considered to be a building where an elevator is not installed, the elevator control is not performed.

In addition, the "building 2" with the building ID "B002" may be associated with the event program "P102" performing control of the content that, with respect to the control command "C002" of "20% power saving", for the "lighting control", the "blinds in the vicinity of the lighting 1 and the lighting 2 are drawn up"; for the "air-conditioning control", the "set temperature is changed 2° C."; and for the "elevator control", the "elevator 1" is stopped.

In this manner, the buildings are associated with the respective control commands instructing different amounts of power saving, so that the event programs embodying individual control of the facility devices 15 for embodying the respective power saving may be associated. Therefore, even though one control command is commonly transmitted from the wide area management device 20 to the building management devices 30, in the respective building management devices 30, the power consumption can be controlled by the control methods unique to the facility devices 15 installed in the respective buildings 14.

Therefore, although the wide area management device 20 does not generate different control commands for the respective buildings 14 to individually transmit the control command to the respective buildings 14 every time when the power saving is needed, if the wide area management device commonly transmits one control command instructing the entire power saving to all the buildings 14 which are to be managed, desired power saving over the entire buildings 14 can be implemented.

Figure 10:
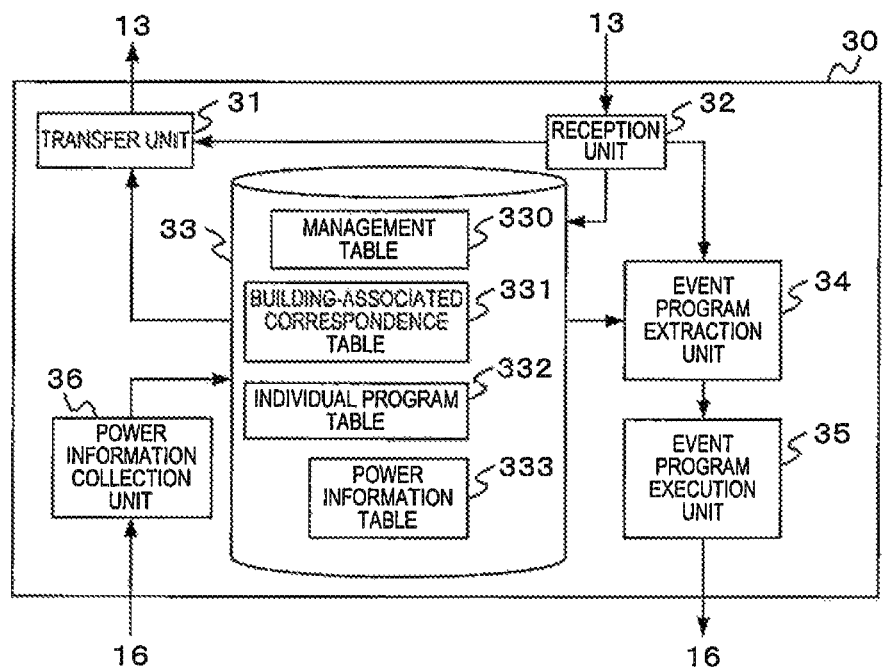
FIG. 10 is a block diagram illustrating an example of a functional configuration of the building management device 30 according to the first embodiment.

FIG. 10 is a block diagram illustrating an example of a functional configuration of the building management device 30 according to the first embodiment. The building management device 30 according to the embodiment is configured to include a transfer unit 31, a reception unit 32, a database 33, an event program extraction unit 34, an event program execution unit 35, and a power information collection unit 36. The database 33 stores a management table 330, a building-associated correspondence table 331, an individual program table 332, and a power information table 333.

The management table 330 stores the data described with reference to FIG. 4. The building-associated correspondence table 331 stores the data in the building-associated correspondence table 2231 associated with the building ID of the building corresponding to the self building management device 30 in the correspondence table 223 described with reference to FIG. 7. The individual program table 332 stores the program ID and the corresponding event program main body stored in the building-associated correspondence table 331 in the program table 222 described with reference to FIG. 6.

The power information table 333 has the same data structure as the power information table 224 described with reference to FIG. 8; the power information table 333 stores the power information of the building 14 corresponding to the self building management device 30; and if the self building management device 30 is a representative management device, the power information table 333 also stores the power information of the buildings 14 corresponding to the lower-level building management devices 30.

In a case where the reception unit 32 receives the management table from the wide area management device 20, the reception unit 32 transmits the received management table to the transfer unit 31 and stores the received management table as the management table 330 in the database 22.

In addition, in a case where the correspondence table is received from the wide area management device 20, the reception unit 32 transmits the received correspondence table to the transfer unit 31, extracts the building-associated correspondence table which is associated with the building ID of the building 14 corresponding to the self building management device 30 in the received correspondence table, and stores the extracted building-associated correspondence table as the building-associated correspondence table 331 in the database 22.

In addition, in a case where the program table is received from the wide area management device 20, the reception unit 32 transmits the received program table to the transfer unit 31, extracts the event program main body which is associated with the program ID registered in the building-associated correspondence table 331 of the database 22 in the received program table, and stores the extracted event program main body in association with the program ID as the individual program table 332 in the database 22.

In addition, in a case where the command ID is received from the wide area management device 20, the reception unit 32 transmits the received command ID to the transfer unit 31 and the event program extraction unit 34. In addition, in a case where the building ID and the power information indicating the power consumption of the corresponding building are received from the lower-level building management device 30, the reception unit 32 stores the received power information in the individual power information table which is associated with the corresponding building ID in the power information table 333 of the database 22.

In a case where the transfer unit 31 receives the management table from the reception unit 32, the transfer unit 31 specifies the address information of a different building management device 30 registered in the management table as a lower-level building management device of the self building management device 30 and transfers the management table to the destination indicated by the specified address information.

In addition, in a case where the transfer unit 31 receives the correspondence table, the program table, or the command ID from the reception unit 32, the transfer unit 31 specifies the address information of a different building management device 30 registered as a lower-level building management device of the self building management device 30 by referring to the management table 330 of the database 33 and transfers the received information to the destination indicated by the specified address information.

In addition, in a case where the power information is registered in the power information table 333 of the database 33, the transfer unit 31 specifies the address information of a different building management device 30 (an upper-level representative management device) or the wide area management device 20 in which the self building management device 30 is registered as a lower-level building management device by referring to the management table 330 of the database 33 and transfers the power information together with the associated building ID to the destination indicated by the specified address information.

In a case where the event program extraction unit 34 receives the command ID from the reception unit 32, the event program extraction unit 34 specifies the program ID which is associated with the received command ID by referring to the building-associated correspondence table 331 of the database 33. Next, the event program extraction unit 34 extracts the event program which is associated with the specified program ID from the individual program table 332 of the database 33 and transmits the extracted event program to the event program execution unit 35.

The event program execution unit 35 executes the event program received from the event program extraction unit 34 to control operations of the facility devices 15 installed in the building 14 through the communication network 16 to control the power consumption of the facility devices 15.

The power information collection unit 36 collects the measured values of power consumption of the facility devices 15 in the building 14 through the communication network 16 at each predetermined timing. In addition, the power information collection unit 36 sums the measured values of the power consumption of all the facility devices 15 for every predetermined time zone and stores the value of sum of the power consumption in the columns of the time zone corresponding to the corresponding date in the power information table 333 of the database 33.

Figure 11:
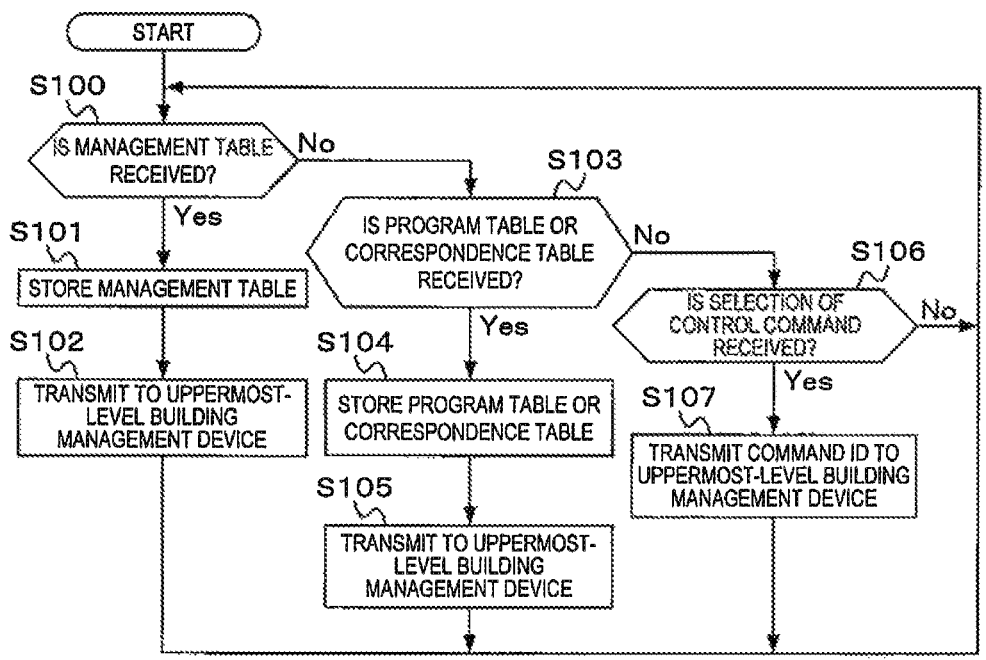
FIG. 11 is a flowchart illustrating an example of operations of the wide area management device 20 according to the first embodiment.

FIG. 11 is a flowchart illustrating an example of operations of the wide area management device 20 according to the first embodiment. The flowchart illustrates operations relating to transmission of data of the management table and the like. In addition, separately from the flowchart, the wide area management device 20 receives power information, at any time, from the building management devices 30 through the communication lines 13 to store the power information in the power information table 224 of the database 22 and outputs the data in the power information table 224 to the manipulation terminal 11 in response to a request of the manipulation terminal 11.

First, the registration information acquisition unit 23 determines whether the management table is received (S100). In a case where the management table is received (S100: Yes), the registration information acquisition unit 23 stores the received management table as the management table 221 in the database 22 (S101). Next, the transmission unit 25 specifies the address information of the uppermost-level building management device 30 by referring to the management table 221 of the database 22. Next, the transmission unit 25 transmits the management table 221 to the destination indicated by the specified address information (S102), and the registration information acquisition unit 23 performs the process illustrated in step S100 again.

In a case where the management table is not received (S100: No), the registration information acquisition unit 23 determines whether the program table or the correspondence table is received (S103). In a case where the program table or the correspondence table is received (S103: Yes), the registration information acquisition unit 23 stores the received program table or correspondence table as the program table 222 or the correspondence table 223 in the database 22 (S104).

Next, the transmission unit 25 specifies the address information of the uppermost-level building management device 30 by referring to the management table 221 of the database 22. Next, the transmission unit 25 transmits the program table 222 or the correspondence table 223 to the destination indicated by the specified address information (S105), and the registration information acquisition unit 23 performs the process illustrated in step S100 again.

In a case where both of the program table and the correspondence table are not received (S103: No), the control command acquisition unit 21 determines whether the selection of the control command is received (S106). In a case where the selection of the control command is received (S106: Yes), the control command acquisition unit 21 specifies the command ID corresponding to the selected control command by referring to the command table 220 of the database 22 and transmits the specified command ID to the transmission unit 25.

Next, the transmission unit 25 specifies the address information of the uppermost-level building management device 30 by referring to the management table 221 of the database 22 and transmits the command ID received from the control command acquisition unit 21 to the destination indicated by the specified address information (S107), and the registration information acquisition unit 23 performs the process illustrated in step S100 again.

Figure 12:
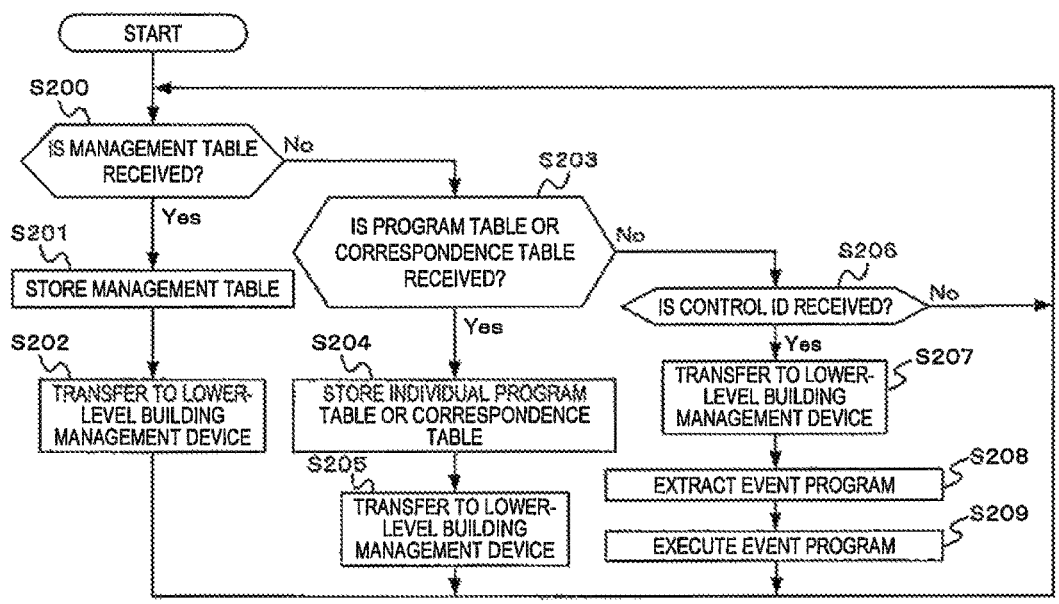
FIG. 12 is a flowchart illustrating an example of operations of the building management device 30 according to the first embodiment.

FIG. 12 is a flowchart illustrating an example of operations of each building management device 30 according to the first embodiment. The flowchart illustrates operations relating to reception and transfer of data of the management table and the like. In addition, separately from the flowchart, each building management device 30 collects power information, at any time, from the facility devices of the corresponding building or the lower-level building management devices 30 to store the power information in the power information table 333 of the database 33 and transmits the power information in the power information table 333 through the communication lines 13 to the wide area management device 20 or the upper-level representative management device.

First, the reception unit 32 determines whether the management table is received from the wide area management device 20 or the upper-level representative management device (S200). In a case where the management table is received (S200: Yes), the reception unit 32 transmits the received management table to the transfer unit 31 and stores the received management table in the database 22 (S201).

The transfer unit 31 specifies the address information of a different building management device 30 registered in the management table as a lower-level building management device of the self building management device 30 by referring to the management table received from the reception unit 32. Next, the transfer unit 31 transfers the received management table to the destination indicated by the specified address information (S202), and the reception unit 32 performs the process illustrated in step S200 again.

In a case where the management table is not received (S200: No), the reception unit 32 determines whether the program table or the correspondence table is received from the wide area management device 20 or the upper-level representative management device (S203). In a case where the program table or the correspondence table is received (S203: Yes), the reception unit 32 transmits the received program table or the correspondence table to the transfer unit 31. Next, the reception unit 32 generates the individual program table 332 or the building-associated correspondence table 331 from the received program table or the correspondence table and stores the individual program table or the building-associated correspondence table in the database 33 (S204).

The transfer unit 31 specifies the address information of a different building management device 30 registered in the management table as a lower-level building management device of the self building management device 30 by referring to the management table 330 of the database 33. Next, the transfer unit 31 transfers the program table or correspondence table received from the reception unit 32 to the destination indicated by the specified address information (S205), and the reception unit 32 performs the process illustrated in step S200 again.

In a case where both of the program table and the correspondence table are not received (S203: No), the reception unit 32 determines whether the command ID is received from the wide area management device 20 or the upper-level representative management device (S206). In a case where the command ID is not received (S206: No), the reception unit 32 performs the process illustrated in step S200 again.

In a case where the command ID is received (S206: Yes), the reception unit 32 transmits the received command ID to the transfer unit 31 and the event program extraction unit 34. The transfer unit 31 specifies the address information of a different building management device 30 registered in the management table as a lower-level building management device of the self building management device 30 by referring to the management table 330 of the database 33. Next, the transfer unit 31 transfers the command ID received from the reception unit 32 to the destination indicated by the specified address information (S207).

Next, the event program extraction unit 34 specifies the program ID which is associated with the received command ID by referring to the building-associated correspondence table 331 of the database 33 based on the command ID received from the reception unit 32. Next, the event program extraction unit 34 extracts the event program which is associated with the specified program ID by referring to the individual program table 332 of the database 33 and transmits the extracted event program to the event program execution unit 35 (S208).

Next, the event program execution unit 35 executes the event program received from the event program extraction unit 34 (S209), controls operations of the facility devices 15 installed in the building 14, and controls the power consumption of the facility devices 15. Next, the reception unit 32 performs the process illustrated in step S200 again.

Heretofore, the first embodiment of the present invention has been described.

As clarified from the above description, according to the wide area management system 10 of the present invention, even in a case where there are many buildings 14 which are to be managed, an increase in communication traffic at the time of transmission of commands and the like of controlling power consumption of individual buildings 14 can be suppressed so as to be low.

Next, a second embodiment of the present invention will be described with reference to the drawings.

The system configuration diagram of the embodiment is the same as that of the first embodiment illustrated in FIG. 1. In addition, the functional configuration of the wide area management device 20 according to the embodiment is also the same as that of the first embodiment illustrated in FIG. 3. However, the data structure of the management table 221 of the database 22 is slightly different from the power information table 224 of the first embodiment.

FIG. 13 is a diagram illustrating an example of a data structure of a management table 221 stored in a database 22 in the second embodiment. As illustrated in FIG. 13, in addition to the building ID 2210, the address information 2211, and the lower-level ID 2212, the management table 221 stores data of the rated power 2213 representing the power consumed during rated operation in the building 14 corresponding to the building ID 2210.

Figure 14:
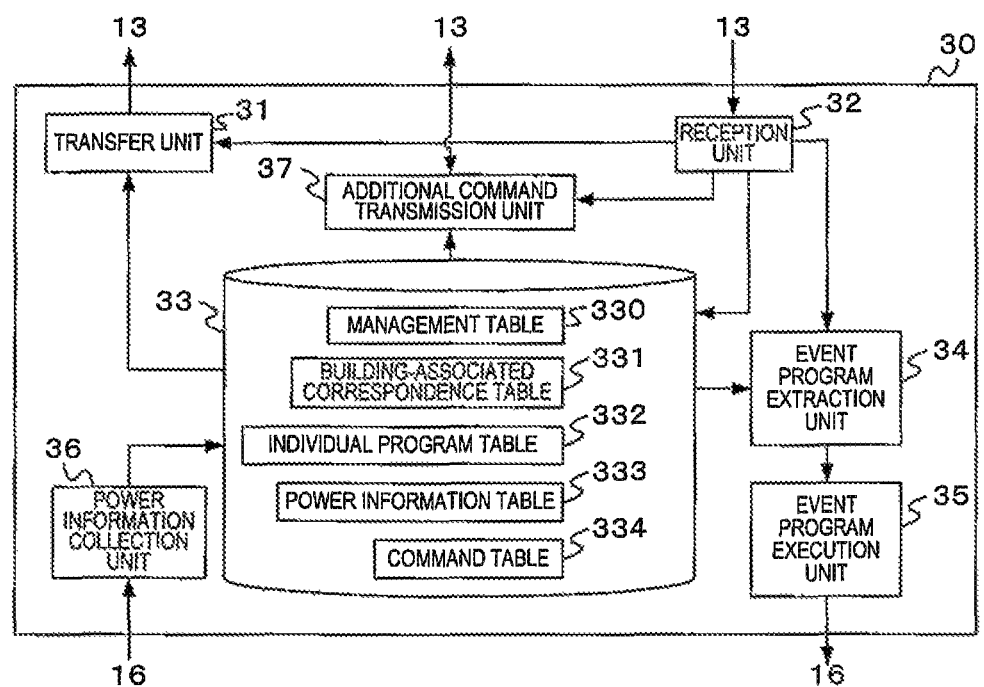
FIG. 14 is a block diagram illustrating an example of a functional configuration of a building management device 30 according to the second embodiment.

FIG. 14 is a block diagram illustrating an example of a functional configuration of a building management device 30 according to the second embodiment. The building management device is configured to include a transfer unit 31, a reception unit 32, a database 33, an event program extraction unit 34, an event program execution unit 35, a power information collection unit 36, and an additional command transmission unit 37. The database 33 stores a management table 330, a building-associated correspondence table 331, an individual program table 332, a power information table 333, and a command table 334. In addition, except for the points described below, in FIG. 14, since the components denoted by the same reference numerals as those of FIG. 10 have the same or similar functions as those of the components in FIG. 10, the detailed description is omitted.

The management table 330 stores the data of the management table 221 described with reference to FIG. 13. In a case where the reception unit 32 receives the command ID from the wide area management device 20, the reception unit 32 transmits the received command ID to the transfer unit 31, the event program extraction unit 34, and the additional command transmission unit 37.

The additional command transmission unit 37 determines whether the self building management device 30 is a representative management device by determining whether a different building management device 30 exists in the lower level by referring to the management table 330 of the database 33. In a case where the self building management device 30 is a representative management device, the additional command transmission unit 37 determines whether a different representative management device exists in the lower level by further referring to the management table 330 of the database 33.

In a case where a different representative management device does not exist in the lower level, when a predetermined time (for example, 10 minutes) elapses after the event program corresponding to the command ID received from the reception unit 32 is executed by the event program execution unit 35, or when the value of power consumption corresponding to a predetermined building ID is updated by referring to the power information table 333, the additional command transmission unit 37 calculates the values of power consumption which is to be achieved according to the control command corresponding to the command ID received from the reception unit 32 in association with the buildings 14 of the self building management device 30 and the lower-level building management devices 30 by referring to the management table 330 and command table 334 of the database 33.

For example, in a case where the control command corresponding to the command ID received from the reception unit 32 is a command indicating that the power consumption is reduced 20% of the power consumption during rated operation and the power consumption during rated operation of the building 14 corresponding to the self building management device 30 or the lower-level building management device 30 is 50 kW, the additional command transmission unit 37 calculates the value of the power consumption which is to be achieved according to the control command as 50 kW×0.8=40 kW.

Next, the additional command transmission unit 37 extracts values of the current power consumption of the buildings 14 corresponding to the self building management device 30 and the lower-level building management devices 30 by referring to the power information table 333 of the database 33 and calculates the value of sum of the extracted current power consumption. In addition, the additional command transmission unit 37 calculates the values of sum of the power consumption which the buildings 14 corresponding to the self building management device 30 and the lower-level building management devices 30 are to achieve according to the control command. Next, the additional command transmission unit 37 determines whether the calculated value of sum of the current power consumption is smaller than the value of sum of the power consumption which is to be achieved according to the control command.

In a case where the value of sum of the current power consumption is smaller than the value of sum of the power consumption which is to be achieved according to the control command, the additional command transmission unit 37 specifies the address information of the different building management devices 30 (an upper-level representative management devices) in which the self building management device 30 is registered as the lower-level building management devices or the wide area management device 20 by referring to the management table 330 of the database 33. Next, the additional command transmission unit 37 transmits the result notice including information indicating achievement to the destination indicated by the specified address information.

On the other hand, in a case where the value of sum of the current power consumption is equal to or larger than the value of sum of the power consumption which is to be achieved according to the control command, the additional command transmission unit 37 searches for the buildings 14 of which the value of the current power consumption is smaller than the value of the power consumption which is to be achieved according to the control command. In a case where the buildings 14 of which the value of the current power consumption is smaller than the value of the power consumption which is to be achieved according to the control command do not exist, the additional command transmission unit 37 transmits the result notice including information indicating non-achievement to the upper-level representative management device or the wide area management device 20.

In addition, in a case where one or more buildings 14 of which the value of the current power consumption is smaller than the value of the power consumption which is to be achieved according to the control command exist, the additional command transmission unit 37 selects one destination for the additional command among the buildings 14 of which the value of the current power consumption is smaller than the value of the power consumption which is to be achieved according to the control command.

The destination for the additional command may be selected at random among the buildings 14 of which the value of the current power consumption is smaller than the value of the power consumption which is to be achieved according to the control command. In order that the additional commands are not concentrated on one building 14, the building 14 of which the recorded number of times of reception of the previous additional command is small may be preferentially selected. The building 14 of which the power consumption during rated operation is large may be preferentially selected. Alternatively, all the buildings 14 of which the value of the current power consumption is smaller than the value of the power consumption which is to be achieved according to the control command may be selected as the destinations for the additional command.

Next, with respect to the buildings 14 corresponding to the self building management device 30 and the lower-level building management devices 30, the additional command transmission unit 37 calculates a difference between the value of sum of the current power consumption and the value of sum of the power consumption which is to be achieved according to the control command as an insufficient portion of a reduction amount. Next, the additional command transmission unit 37 generates an additional command by further adding the power consumption corresponding to the calculated insufficient portion to the power consumption which is to be achieved according to the control command and transmits the command ID corresponding to the generated additional command to the building management device 30 of the selected building 14.

For example, as a result of the control according to the initial control command indicating that the power consumption is uniformly reduced 20% of the power consumption during rated operation, the building 14 of which power consumption is 21% of the power consumption during normal operation is selected as the destination for the additional command, if the power consumption during rated operation of the building 14 is 40 kW and the insufficient portion of the power consumption is 3.1 kW, the additional command transmission unit 37 adds the insufficient portion of the power to the building management device 30 to generate the control command indicating that the power consumption is reduced 30% of the power consumption during rated operation and transmits the command ID corresponding to the generated control command to the building management device 30 of the building 14.

In addition, in a case where different representative management devices exist in the lower level, the additional command transmission unit 37 stands by until the result notice is received from all the lower-level representative management devices. In a case where the result notice is received from all the lower-level representative management devices, the additional command transmission unit 37 extracts the values of the current power consumption of the buildings 14 corresponding to the self building management device 30 and the lower-level building management devices 30 by referring to the power information table 333 of the database 33 and calculates the value of sum of the extracted current power consumption. Next, the additional command transmission unit 37 determines whether the calculated value of sum of the current power consumption is smaller than the value of sum of the power consumption which is to be achieved according to the control command.

In a case where the value of sum of the current power consumption is smaller than the value of sum of the power consumption which is to be achieved according to the control command, the additional command transmission unit 37 transmits the result notice including information indicating achievement to the upper-level different representative management device or the wide area management device 20.

On the other hand, in a case where the value of sum of the current power consumption is equal to or larger than the value of sum of the power consumption which is to be achieved according to the control command, the additional command transmission unit 37 searches for a building 14 of which the value of the current power consumption is smaller than the value of the power consumption which is to be achieved according to the control command or a lower-level representative management device which transmits the result notice indicating achievement. In a case where neither a building 14 of which the value of the current power consumption is smaller than the value of the power consumption which is to be achieved according to the control command nor a lower-level representative management device which transmits the result notice indicating achievement exists, the additional command transmission unit 37 transmits the result notice including information indicating non-achievement to the upper-level representative management device or the wide area management device 20.

In addition, in a case where one or more buildings 14 of which the value of the current power consumption is smaller than the value of the power consumption which is to be achieved according to the control command or one or more lower-level representative management devices which transmit the result notice indicating achievement exist, the additional command transmission unit 37 selects one destination for the additional command among the buildings or the representative management devices.

In addition, since there is a possibility that the lower-level representative management device has already transmitted the additional command to a further lower-level building management device 30, it is preferable that the lower-level representative management device be not selected as a destination for the additional command.

Next, with respect to the buildings 14 corresponding to the self building management device 30 and the lower-level building management devices 30 (including lower-level representative management devices and further-lower-level building management devices 30), the additional command transmission unit 37 calculates a difference between the value of sum of the current power consumption and the value of sum of the power consumption which is to be achieved according to the control command as an insufficient portion of a reduction amount. Next, the additional command transmission unit 37 generates an additional command by further adding the power consumption corresponding to the calculated insufficient portion to the power consumption which is to be achieved according to the control command and transmits the command ID corresponding to the generated additional command to the building management device 30 of the selected building 14.

Figure 15:
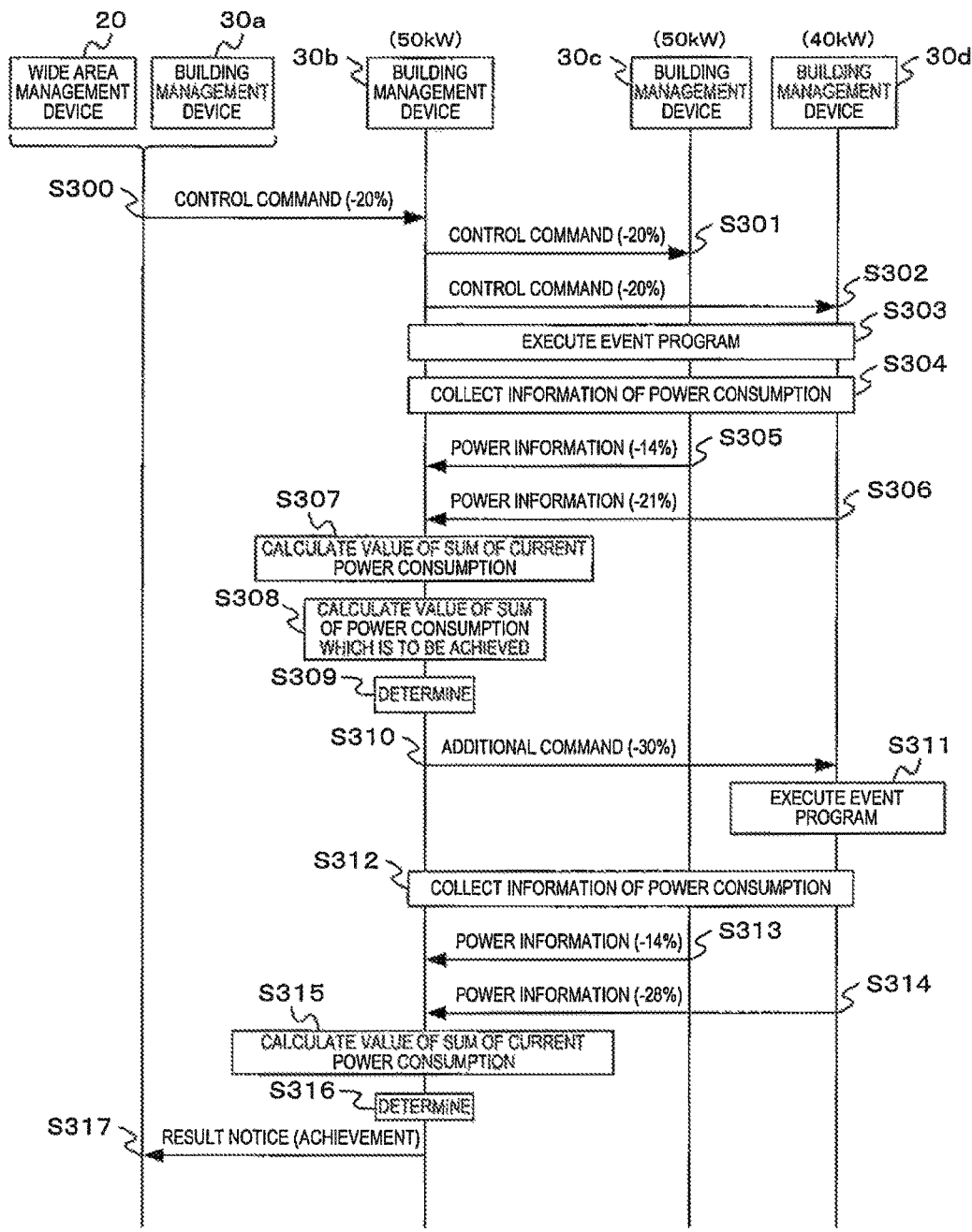
FIG. 15 is a sequence diagram illustrating an example of operations of a wide area management system 10 according to the second embodiment.

Next, the entire operations of the wide area management system 10 according to the second embodiment will be described with reference to FIG. 15. FIG. 15 is a sequence diagram illustrating an example of the operations of the wide area management system 10 according to the second embodiment. In addition, in FIG. 15, it is assumed that the building management devices 30a and 30b operate as representative management devices and the values of power consumption during rated operation of the buildings 14 corresponding to the building management devices 30b to 30d are 50 kW, 50 kW, and 40 kW, respectively.

First, the transmission unit 25 of the wide area management device 20 or the transfer unit 31 of the building management device 30a transmits the command ID (S300). In the example of FIG. 15, the command ID of the control command indicating that the power consumption is uniformly reduced 20% of the power consumption during rated operation is transmitted. The transfer unit 31 of the building management device 30b transfers the received command ID to the lower-level building management devices 30c and 30d (S301 and S302).

Next, in each of the building management devices 30b to 30d, the event program execution unit 35 performs the event program corresponding to the received command ID (S303), and the power information collection unit 36 collects the power information of each building 14 and stores the power information in the power information table 333 of the database 33 (S304). Next, the transfer units 31 of the building management devices 30c and 30d transfer the power information stored in the power information table 333 to the building management device 30b that is a representative management device (S305 and S306).

Herein, the power consumption of the building 14 corresponding to the building management device 30b after the execution of the event program becomes −20% (80%) of the power consumption during rated operation; the power consumption of the building 14 corresponding to the building management device 30b becomes −14% (86%) of the power consumption during rated operation; and the power consumption of the building 14 corresponding to the building management device 30c becomes −21% (79%) of the power consumption during rated operation.

Next, the additional command transmission unit 37 of the building management device 30b extracts the values of the current power consumption of the buildings 14 corresponding to the self building management device 30b and the lower-level building management devices 30c and 30d by referring to the power information table 333 of the database 33 and calculates the value of sum of the extracted current power consumption (S307).

In the example illustrated in FIG. 15, the values of power consumption during rated operation of the buildings 14 corresponding to the building management devices 30b to 30d are 50 kW, 50 kW, and 40 kW, respectively; the value of the current power consumption of the building 14 corresponding to the self building management device 30b becomes 50 kW×0.8=40 kW; the value of the current power consumption of the building 14 corresponding to the lower-level building management device 30c becomes 50 kW×0.86=43 kW; and the value of the current power consumption of the building 14 corresponding to the lower-level building management device 30d becomes 40 kW×0.79=31.6 kW. Therefore, the additional command transmission unit 37 of the building management device 30b calculates 40 kW+43 kW+31.6 kW=114.6 kW as the value of sum of the current power consumption.

Next, the additional command transmission unit 37 of the building management device 30b calculates the value of sum of the power consumption which the buildings 14 corresponding to the self building management device 30b and the lower-level building management devices 30c and 30d are to achieve according to the control command (S308). In the example illustrated in FIG. 15, the values of power consumption during rated operation of the buildings 14 corresponding to the building management devices 30b to 30d are 50 kW, 50 kW, and 40 kW, respectively, and the value of sum of the power consumption which is to be achieved according to the control command indicating that the power consumption is uniformly reduced 20% of the power consumption during rated operation becomes 50 kW×0.8+50 kW×0.8+40 kW×0.8=112 kW.

Next, the additional command transmission unit 37 of the building management device 30b determines whether the calculated value of sum of the current power consumption is smaller than the value of sum of the power consumption which is to be achieved according to the control command (S309). In the example of FIG. 15, since the value of sum of the current power consumption is 114.6 kW, the additional command transmission unit 37 of the building management device 30b determines that the calculated value of sum of the current power consumption is more than 112 kW which is the value of sum of the power consumption to be achieved according to the control command, that is, 112 kW or more.

Next, the additional command transmission unit 37 of the building management device 30b selects one building 14 which is to be the destination for the additional command among the buildings 14 of which the value of the current power consumption is smaller than the value of the power consumption which is to be achieved according to the control command. In the example of FIG. 15, since the buildings 14 of which the value of the current power consumption are smaller than the value of the power consumption which is to be achieved according to the control command is the buildings 14 corresponding to the building management devices 30b and 30d, the additional command transmission unit 37 of the building management device 30b selects, for example, the building 14 corresponding to the building management devices 30d as the destination for the additional command.

Next, with respect to the buildings 14 corresponding to the self building management device 30b and the lower-level building management devices 30c and 30d, the additional command transmission unit 37 of the building management device 30b calculates a difference between the value of sum of the current power consumption and the value of sum of the power consumption which is to be achieved according to the control command as an insufficient portion of a reduction amount. In the example of FIG. 15, since the value of sum of the current power consumption is 114.6 kW and the value of sum of the power consumption which is to be achieved according to the control command is 112 kW, the additional command transmission unit 37 of the building management device 30b calculates 114.6 kW−112 kW=2.6 kW as an insufficient portion of a reduction amount.

Next, the additional command transmission unit 37 of the building management device 30b generates an additional command by further adding the power consumption corresponding to the calculated insufficient portion to the power consumption which is to be achieved according to the control command and transmits the command ID corresponding to the generated additional command to the building management device 30 corresponding to the selected building 14. In the example of FIG. 15, since the power consumption during rated operation of the building management devices 30d is 40 kW, the reduction amount corresponding to the insufficient portion becomes 2.6 kW÷40 kW×100=6.5%; and since the control command for 20% reduction is transmitted in advance, the control command of 20%+6.5%=26.5% or more reduction may be transmitted.

The additional command transmission unit 37 of the building management device 30b specifies the control command for 30% reduction as the control command nearest to the control command indicating that the power consumption is reduced 26.5% of the power consumption during rated operation by referring to the command table 334 of the database 33. Next, the additional command transmission unit 37 of the building management device 30*b* transmits the command ID corresponding to the generated control command to the building management device 30*d* (S310). The event program execution unit 35 of the building management device 30*d* executes the event program corresponding to the received command ID (S311).

Next, the power information collection units 36 of the building management devices 30*b* to 30*d* collect the power information of the buildings 14 and stores the power information in the power information table 333 of the database 33 (S312). Next, the transfer units 31 of the building management devices 30*c* and 30*d* transfer the power information stored in the power information table 333 to the building management device 30*b* that is a representative management device (S313 and S314).

Herein, it is assumed that the power consumption of the building 14 corresponding to the building management device 30*b* measured in step S312 becomes −20% (80%) of the power consumption during rated operation; the power consumption of the building 14 corresponding to the building management device 30*c* becomes −14% (86%) of the power consumption during rated operation; and the power consumption of the building 14 corresponding to the building management device 30*d* becomes −28% (72%) of the power consumption during rated operation.

Next, the additional command transmission unit 37 of the building management device 30*b* extracts the values of the current power consumption of the buildings 14 corresponding to the self building management device 30*b* and the lower-level building management devices 30*c* and 30*d* by referring to the power information table 333 of the database 33 again and calculates the value of sum of the extracted current power consumption (S315).

At the point of step S315, the value of the current power consumption of the building 14 corresponding to the self building management device 30*b* becomes 50 kW×0.8=40 kW; the value of the current power consumption of the building 14 corresponding to the lower-level building management device 30*c* becomes 50 kW×0.86=43 kW; and the value of the current power consumption of the building 14 corresponding to the lower-level building management device 30*d* becomes 40 kW×0.72=28.8 kW. Therefore, the additional command transmission unit 37 of the building management device 30*b* calculates the value of sum of the power consumption at the point of step S315, that is, 40 kW+43 kW+28.8 kW=111.8 kW as the value of sum of the current power consumption.

Next, since the calculated value of sum of the current power consumption is 111.8 kW, the additional command transmission unit 37 of the building management device 30*b* determines that the value of sum of the power consumption which is to be achieved according to the control command is smaller than 112 kW (S316) and transmits the result notice including information indicating achievement to the wide area management device 20 or the upper-level representative management device (S317).

In this manner, since each representative management device generates and transmits the additional command so that the control command corresponding to the command ID transmitted from the wide area management device 20 or the upper-level representative management device is embodied among the self building management device 30 and the lower-level building management devices 30, although the power consumption of the buildings 14 corresponding to a portion of the building management devices 30 is not reduced in accordance to the control command, it is possible to remove the trouble that the manager 12 selects the control command again through the wide area management device 20. For this reason, it is possible to provide further highly convenient wide area management system 10. In addition, each representative management device first calculates the value of sum of the current power consumption, calculates the value of sum of the power consumption which is to be achieved, and transmits the additional command to the building management devices when the power consumption is not achieved, so that it is possible to appropriately reduce the power consumption of the buildings connected to loads of each representative management device.

Heretofore, the second embodiment of the present invention has been described.

Figure 16:
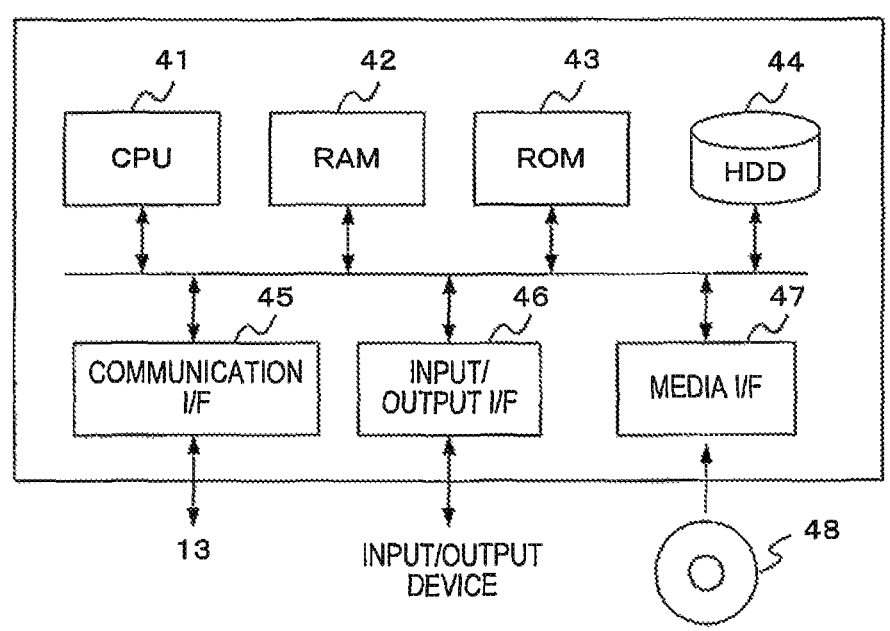
FIG. 16 is a diagram illustrating an example of a hardware configuration of a computer 40 embodying functions of the wide area management device 20 or the building management device 30.

In addition, the wide area management device 20 or each building management device 30 according to the first or second embodiment is embodied by, for example, a computer 40 having a configuration illustrated in FIG. 16.

FIG. 16 is a diagram illustrating an example of a hardware configuration of a computer 40 embodying functions of the wide area management device 20 or each building management device 30. The computer 40 is configured to include a Central Processing Unit (CPU) 41, a Random Access Memory (RAM) 42, a Read Only Memory (ROM) 43, a Hard Disk Drive (HDD) 44, a communication interface (I/F) 45, an input/output interface (I/F) 46, and a media interface (I/F) 47.

The CPU 41 operates based on the program stored in the ROM 43 or the HDD 44 to perform control of components. The ROM 43 stores a boot program executed by the CPU 41 at the time of activation of the computer 40 or programs depending on the hardware of the computer 40.

The HDD 44 stores the program which is to be executed by the CPU 41 and data used by the program. The communication interface 45 receives data from different devices through the communication line 13 to transmit the data to the CPU 41 and transmits data generated by the CPU 41 through the communication line 13 to the different devices.

The CPU 41 controls an output device such as a display and an input device such as a mouse and a keyboard through the input/output interface 46. The CPU 41 acquires signals through the input/output interface 46 from the input device. In addition, the CPU 41 outputs the generated signal through the input/output interface 46 to the output device.

The media interface 47 reads a program or data stored in the recording medium 48 and provides the program or data through the RAM 42 to the CPU 41. The CPU 41 loads the program on the RAM 42 through the media interface 47 from the recording medium 48 and executes the loaded program. The recording medium 48 is, for example, an optical recording medium such as a Digital Versatile Disk (DVD) and a Phase change rewritable Disk (PD), an opto-magnetic recording medium such as a Magneto-Optical disk (MO), a tape medium, a magnetic recording medium, a semiconductor memory, or the like.

In a case where the computer 40 functions as the wide area management device 20 according to the first and second embodiments, the CPU 41 of the computer 40 executes the program loaded on the RAM 42 to embody the functions of the control command acquisition unit 21, the database 22, the registration information acquisition unit 23, the information output unit 24, the transmission unit 25, and the reception unit 26. In addition, the data of the database 22 may be stored in the ROM 43 or the HDD 44 or may be stored in the database on the network.

In addition, in a case where the computer 40 functions as the building management device 30 according to the first embodiment, the CPU 41 of the computer 40 executes the program loaded on the RAM 42 to embody the functions of the transfer unit 31, the reception unit 32, the database 33, the event program extraction unit 34, the event program execution unit 35, and the power information collection unit 36. In addition, the data of the database 33 may be stored in the ROM 43 or the HDD 44 or may be stored in the database on the network.

In addition, in a case where the computer 40 functions as the building management device 30 according to the second embodiment, the CPU 41 of the computer 40 executes the program loaded on the RAM 42 to embody the functions of the transfer unit 31, the reception unit 32, the database 33, the event program extraction unit 34, the event program execution unit 35, the power information collection unit 36, and the additional command transmission unit 37. In addition, the data of the database 33 may be stored in the ROM 43 or the HDD 44 or may be stored in the database on the network.

Although the CPU 41 of the computer 40 reads programs from the recording medium 48 and executes the program, as another example, such programs may be acquired from different devices through the communication lines 13. In addition, the wide area management device 20 or the building management device 30 may not include the HDD 44, and the programs, the data, and the like may be stored in a rewritable ROM 43.

In addition, the present invention is not limited to the above-described embodiments, but various modified examples are included. For example, the above-described embodiments are described in detail in order to explain the present invention for the better understanding, and thus, the present invention does not limit to necessarily including all the components described above. In addition, a portion of components of some embodiments may be replaced with components of other embodiments, and components of some embodiments may be added to components of other embodiments. In addition, with respect to a portion of components of each embodiment, other components may be added, removed, or replaced.

In addition, a portion or all of the above-described components, functions, processing units, processing means, and the like may be implemented in a hardware manner, for example, by designing with integrated circuits. In addition, the above-described configurations, functions, and the like may be implemented in a software manner by allowing a processor to analyze and execute programs implementing the functions. Information of programs, tables, and files implementing the functions may be stored in a recording device such as a memory, a hard disk, and a Solid State Drive (SSD) or a recording medium such as an IC card, an SD card, and a DVD.

In addition, control lines or information lines are illustrated to the extent that the lines are necessary for description, and thus, all the control lines or information lines necessary in terms of a product may not be considered to be illustrated. Actually, almost all the components may be considered to be connected to each other.

REFERENCE SIGNS LIST

10: wide area management system
11: manipulation terminal
12: manager
13: communication line
14: building
15: facility device
16: communication network
17: community cooperation device
18: communication lines
20: wide area management device
21: control command acquisition unit
22: database
220: command table
221: management table
222: program table
223: correspondence table
224: power information table
23: registration information acquisition unit
24: information output unit
25: transmission unit
26: reception unit
30: building management devices
31: transfer unit
32: reception unit
33: database
330: management table
331: building-associated correspondence table
332: individual program table
333: power information table
334: command table
34: event program extraction unit
35: event program execution unit
36: power information collection unit
37: additional command transmission unit
40: computer
41: CPU
42: RAM
43: ROM
44: HDD
45: communication interface
46: input/output interface
47: media interface
48: recording medium

The invention claimed is:

1. A wide area management system which manages power consumed in buildings, comprising:

a wide area management device; and building management devices installed to correspond to the respective buildings, wherein the wide area management device includes:

a first management table storage unit which stores a management table storing information of lower-level building management devices managed by each building management device as an upper-level representative management device for each building management device; and a transmission unit which specifies an uppermost-level building management device by referring to the management table stored in the first management table storage unit and transmits one control command instructing reduction of power consumption of each building for each specified building management device, and wherein each building management device includes:

a second management table storage unit which stores the management table;

an event program storage unit which stores an event program describing a content of control which is to be performed on each facility device in the building corresponding to the building management device in association with the control command in order to implement the control command;
a reception unit which receives the control command from the wide area management device or the upper-level representative management device;
a transfer unit which, in a case where the reception unit receives the control command, specifies lower-level building management devices managed by a self building management device as a representative management device by referring to the management table stored in the second management table storage unit and transfers the received control command to each of the specified lower-level building management devices;
an event program extraction unit which, in a case where the reception unit receives the control command, extracts the event program corresponding to the control command from the event program storage unit an event program execution unit which executes the extracted event program to control the power consumption of each facility device in the building corresponding to the self building management devices;
a power information storage unit which stores information of the power consumption of the buildings corresponding to the building management devices in association with the self building management device and the lower-level building management devices;
a power information collection unit which collects the information of the power consumption of the building corresponding to the self building management device to store the information in the power information storage unit and collects the information of the power consumption of the buildings corresponding to the lower-level building management devices from the lower-level building management devices to store the information in the power information storage unit; and
an additional command transmission unit which, after the transfer unit transfers the control command received by the reception unit to each of the lower-level building management devices and the event program execution unit of the self building management device executes the event program corresponding to the control command, calculates a sum of the power consumption of the building corresponding to the self building management device and the buildings corresponding to the lower-level building management devices by referring to the power information storage unit, in a case where the calculated sum of the power consumption is equal or larger than power consumption of which reduction is instructed by the control command, generates an additional command instructing new reduction of power consumption, and transmits the generated additional command to the event program extraction unit of the self building management device or to at least one of the lower-level building management devices.

2. The wide area management system according to claim 1, wherein the additional command transmission unit selects one destination for the additional command among the event program extraction unit of the self building management device and the lower-level building management devices corresponding to the buildings of which the power consumption is smaller than the power consumption instructed by the control command and transmits the additional command to the selected building management device.

3. The wide area management system according to claim 1, wherein the additional command transmission unit transmits the additional command to each of the event program extraction unit of the self building management device and the lower-level building management devices corresponding to the buildings of which the power consumption is smaller than the power consumption instructed by the control command.

4. A wide area management method in a wide area management system including a wide area management device and building management devices installed in corresponding buildings to manage power consumed in the buildings,
wherein the wide area management device performs:
a transmitting step of specifying an uppermost-level building management device by referring to a first management table storage unit storing a management table storing information of lower-level building management devices managed by each building management device as an upper-level representative management device for each building management device and transmitting one control command instructing reduction of power consumption of each building for each specified building management device, and
wherein each building management device performs:
a receiving step of receiving the control command from the wide area management device or the upper-level representative management device;
a transferring step of, in a case where the reception unit receives the control command, specifying lower-level building management devices managed by a self building management device as a representative management device by referring to a second management table storage unit storing the management table and transferring the received control command to each of the specified lower-level building management devices;
an event program extracting step of, in a case where the control command is received in the receiving step, extracting an event program corresponding to the control command in association with the control command in order to implement the control command by referring to an event program storage unit storing the event program describing a content of control which is to be performed on each facility device in the building corresponding to the building management device;
an event program executing step of executing the extracted event program to control the power consumption of each facility device in the building corresponding to the self building management device;
a power information collecting step of collecting the information of the power consumption of the building corresponding to the self building management device to store the information in the power information storage unit and collecting the information of the power consumption of the buildings corresponding to the lower-level building management devices from the lower-level building management devices to store the information in the power information storage unit; and
an additional command transmitting step of, after the control command received in the receiving step is transferred to each of the lower-level building management devices in the transferring step and the event program corresponding to the control command is executed in the event program executing step of the self building management device, calculating a sum of the power consumption of the building corresponding to the self building management device and the buildings corresponding to the lower-level building management devices by referring to the power information storage unit, in a case where the calculated sum of the power consumption is equal or larger than power consumption of which reduction is instructed by the control command, generating an additional command instructing new reduction of power consumption, and extracting the event program corresponding to the generated additional command in the event program extracting step or transmitting the generated additional command to at least one of the lower-level building management devices.

5. The wide area management method according to claim 4, wherein, in the additional command transmitting step, each building management device selects one destination for the additional command among the self building management device and the lower-level building management devices of which the power consumption is smaller than the power consumption instructed by the control command and transmits the additional command to the selected building management device.

6. The wide area management method according to claim 4, wherein, in the additional command transmitting step, each building management device transmits the additional command to each of the self building management device and the lower-level building management devices of which the power consumption is smaller than the power consumption instructed by the control command.

* * * * *